Oct. 29, 1935.　　　C. E. HERMANN　　　2,018,669
AIR SEPARATOR
Filed Aug. 12, 1931　　　6 Sheets-Sheet 1

Fig.1

Inventor
Charles Edward Hermann
By William Janns Atty.

Oct. 29, 1935.  C. E. HERMANN  2,018,669
AIR SEPARATOR
Filed Aug. 12, 1931  6 Sheets-Sheet 2

Inventor
Charles Edward Hermann
By William Janne Atty.

Oct. 29, 1935.                C. E. HERMANN                2,018,669
                               AIR SEPARATOR
                            Filed Aug. 12, 1931            6 Sheets-Sheet 3

Inventor
Charles Edward Hermann
By William Janus Atty.

Oct. 29, 1935.  C. E. HERMANN  2,018,669
AIR SEPARATOR
Filed Aug. 12, 1931  6 Sheets-Sheet 5

Inventor
Charles Edward Hermann
By William Janus Atty.

Patented Oct. 29, 1935

2,018,669

UNITED STATES PATENT OFFICE 2,018,669

AIR SEPARATOR

Charles Edward Hermann, St. Louis, Mo.

Application August 12, 1931, Serial No. 556,477

12 Claims. (Cl. 183—91)

This invention relates to new and useful improvements in air separators for producing air currents within the separator and obtaining a more efficient separation of pulverized material.

The type of separators to which my invention appertains is of the centrifugal type wherein the pulverized material is conveyed by currents of air into the separator through a plurality of inlets formed in the circumferential wall of the separator near the top thereof. The separator is connected by a suitable pipe to an exhaust fan and the air currents utilized to convey the material to the separator are produced by suction generated in said separator by said exhaust fan. The material upon entering the separator receives circular centrifugal motion which causes the coarse material to drop to the bottom of the separator while the fine material is conveyed out of the separator through the discharge pipe. This swirling motion is imparted to the air and the material by means of vanes or deflector plates, each of which is arranged adjacent to one side of a corresponding inlet and extends inwardly into the separator and controls the direction of flow of the air.

Heretofore these inlets have been formed wide as compared with the depths of said vanes with the result that cross currents of air have been set up in the separator, thereby impairing the efficiency thereof.

One of the primary objects of the present invention is to form the width of each inlet in direct ratio with the depth of the vane, whereby the depth of such vane is greater than the width of the opening. This arrangement insures proper flow of air within the separator and eliminates the formation of cross currents therein.

Other objects of the invention are to form the inlet openings of the separator comparatively narrow and forming the inwardly projecting vanes comparatively deep so that the air is admitted into the separator in the form of a plurality of jets of air discharged in proper direction relatively to each other and to the axis of the separator, and the formation of cross currents is entirely eliminated.

Further objects of the invention are so to mount the vanes that they can be adjusted angularly relative to the periphery of the separator so as to vary the extent of swirling motion and thereby regulate the degree of separation of fineness of the material conveyed from the separator through the discharge pipe.

Still further objects of the invention are to provide simple and efficient means for adjusting said vanes and to provide adjustment of said discharge pipe within said separator further to control the separation of the material discharged therein.

With these and other objects in view, my invention consists in certain novel features of construction and arrangement of parts, hereinafter more fully described and claimed, and illustrated in the accompanying drawings, in which—

Figure 1:
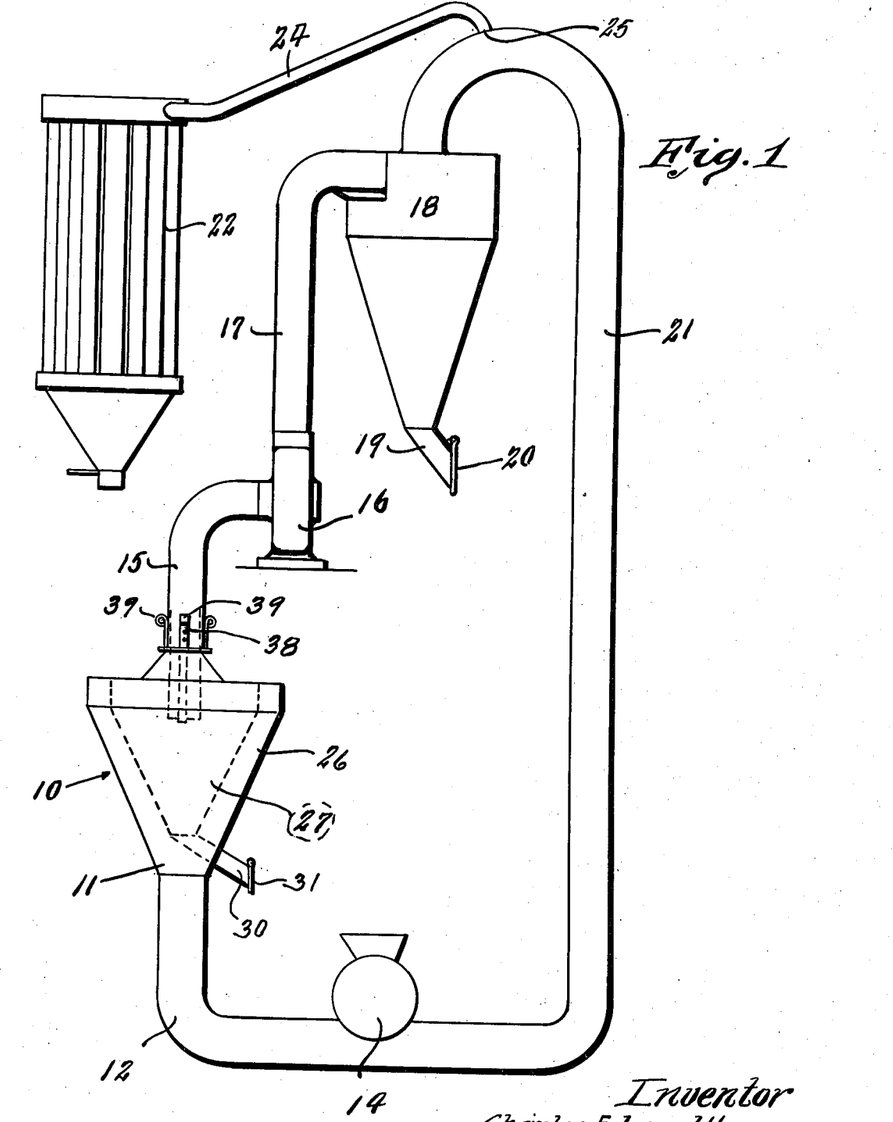
Figure 1 is a diagrammatic view showing the arrangement of my improved separator in combination with the other elements of the separation system.

Referring by numerals to the accompanying drawings, 10 indicates a separator, the lower end 11 of which is connected by a conduit 12 to a feeder 14. This feeder or source of supply of material may be of any desired construction. It may be, for instance, in the form of a mill wherein the material is reduced to suitable degree of fineness before being admitted into the separator. Leading from the upper end of the separator is a conduit 15 which connects to the inlet of a suitable exhaust fan 16. This fan produces suction in the separator, thereby causing air to flow from the feeder through conduit 12 into said separator. In doing so, the air carries the pulverized material from the feeder to the separator and delivers it therein in a manner hereinafter more fully described, whereby the coarse particles are separated from the fine material. The coarse material is collected in the separator and the fine material passes through conduit 15 to the exhaust fan 16, thence through a conduit 17 to a cyclone collector 18. The material which is of suitable fineness is collected in this cyclone collector and can be discharged through the lower end 19 by opening a suitable gate 20. Preferably the air is returned from the cyclone collector to the feeder through a conduit 21, thereby permitting recirculation of the air through the system. However, this air connection between the cyclone collector and the feeder may be dispensed with without interfering in any way with the operation of my separator.

Where air return conduit 21 is used a dust collector 22 is connected by a connection 24 to the return conduit 21, as indicated at 25. This dust collector may be of any well known construction, the type shown being of the tubular kind. The object of this dust collector is to dispose of any excess air that may come into the system through the feeder or otherwise. The dust collects in the lower end of the dust collector and can be discharged therefrom by a suitable valve arranged therein.

Figures 4, 5:
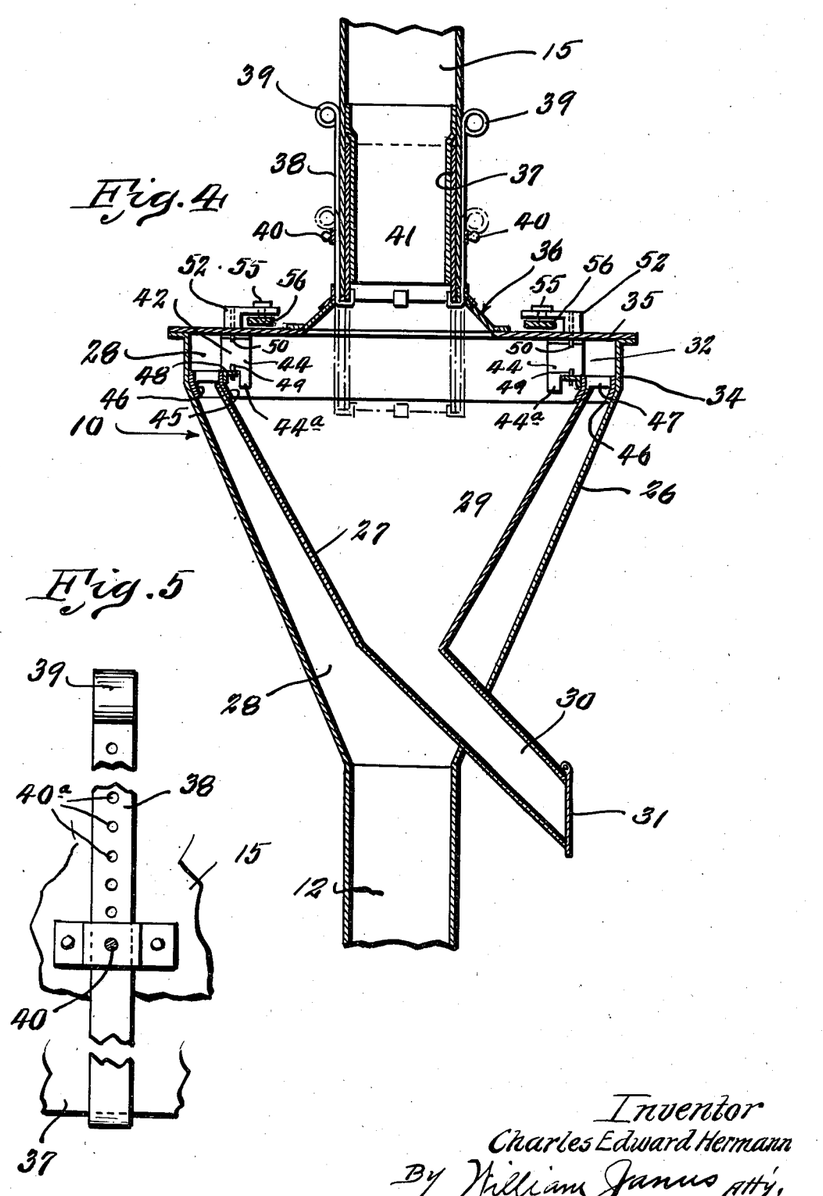
Figure 4 is a vertical cross section taken through the separator.
Figure 5 is a fragmental detail view showing locking means for the adjustable discharge pipe.

The separator 10 is in the form of an inverted cone and consists of an outer shell 26 and an inner shell 27. The inner shell is of smaller dimensions than the outer shell and is spaced therefrom so as to provide an annular receiving chamber 28 to the lower end of which is connected the discharge end of conduit 12 so that the pulverized material is discharged into this chamber 28. The inner shell 27 forms a separating chamber 29, the lower end of which terminates in a spout 30 which extends outwardly through shell 26 and is closed by a gate 31. Thus by opening said gate the material collected in chamber 29 can be discharged through said spout.

The upper portion of the inner shell 27 is formed cylindrical, as indicated at 32, and the upper portion of the outer shell 26 is similarly shaped, as indicated at 34, said portions being concentrically arranged. The upper ends of both of said cylindrical portions terminate in the same horizontal plane and are closed by a horizontally disposed plate 35 which forms the top of the separator.

This plate is provided with a central opening to which is connected the lower end of conduit 15, whereby communication is established between the exhaust fan 16 and chamber 29 of inner member 27. Preferably the junction between plate 35 and conduit 15 is formed oblique as indicated at 36, in order to eliminate sharp corners and to reduce the air resistance to minimum when it is desired to obtain a comparatively coarse product.

As the required degree of fineness of the material may vary, it is desirable to provide means for regulating the fineness of the material discharged from the separator through the conduit 15. This means comprises an extension or sleeve 37 which is loosely mounted in the lower end of conduit 15 and is adjustably supported in position whereby it may be moved vertically and axially to regulate the depth at which the lower end of said sleeve is disposed in the separating chamber 29. The lower the intake end of this sleeve 37 is located in said chamber 29 the finer is the material discharged from said conduit 15, and vice versa. If the sleeve 37 is moved to its extreme upper position, very little resistance is offered to the air and pulverized material discharged into said chamber 29. Consequently most of the material is carried away from chamber 29 and only the very coarse material is collected in the lower end of said separating chamber.

The sleeve 37 is adjustably mounted in position by means of a plurality of vertically disposed bars 38 which are slidably mounted in the top plate 35 adjacent to and spaced around the outer peripheral surface of conduit 15. The lower portions of said bars extend downwardly into chamber 29 and engage said sleeve 37. The upper ends of said bars terminate in suitable handles 39 whereby said bars can be manipulated to adjust said sleeve vertically. The bars can be locked in adjusted positions in any suitable manner, as, for instance, by removable pins 40 which are stationarily mounted and are adapted to engage any one of a plurality of apertures 40a spaced vertically in each bar.

In order to eliminate leakage past the upper end of adjustable sleeve 37, the lower end of pipe or conduit 15 is preferably provided with a fixed sleeve 41 which is of smaller diameter than that of conduit 15 so that an annular chamber is formed for receiving said adjustable sleeve 37. The upper end of fixed sleeve 41 is secured to conduit 15 in such a manner as to seal the joint and prevent air from escaping past the upper end of said sleeve. Thus said sleeve 37 can be adjusted axially so as to provide accurate classification or separation of the material. When said adjustable sleeve occupies its uppermost position, as shown in full lines in Figure 4, the air and pulverized material carried thereby is allowed to pass directly upwardly into pipe 15 so that very little classification takes place and coarse material is discharged from the separator.

As the adjusting sleeve 37 is moved downwardly the air resistance is increased so that only fine material can pass into the conduit 15, the heavier material being deflected downwardly into the lower end of the separator.

A plurality of inlets or openings 42 is formed between the upper end of the cylindrical portion 32 and top wall 35. These inlets establish communication between the outer receiving or peripheral chamber 28 and the inner or separating chamber 29. The suction produced in the latter by the operation of the exhaust fan 16 causes air and the pulverized material to travel from said outer chamber 28 through said openings 42 into said inner chamber 29.

Figures 6, 7, 8, 9:
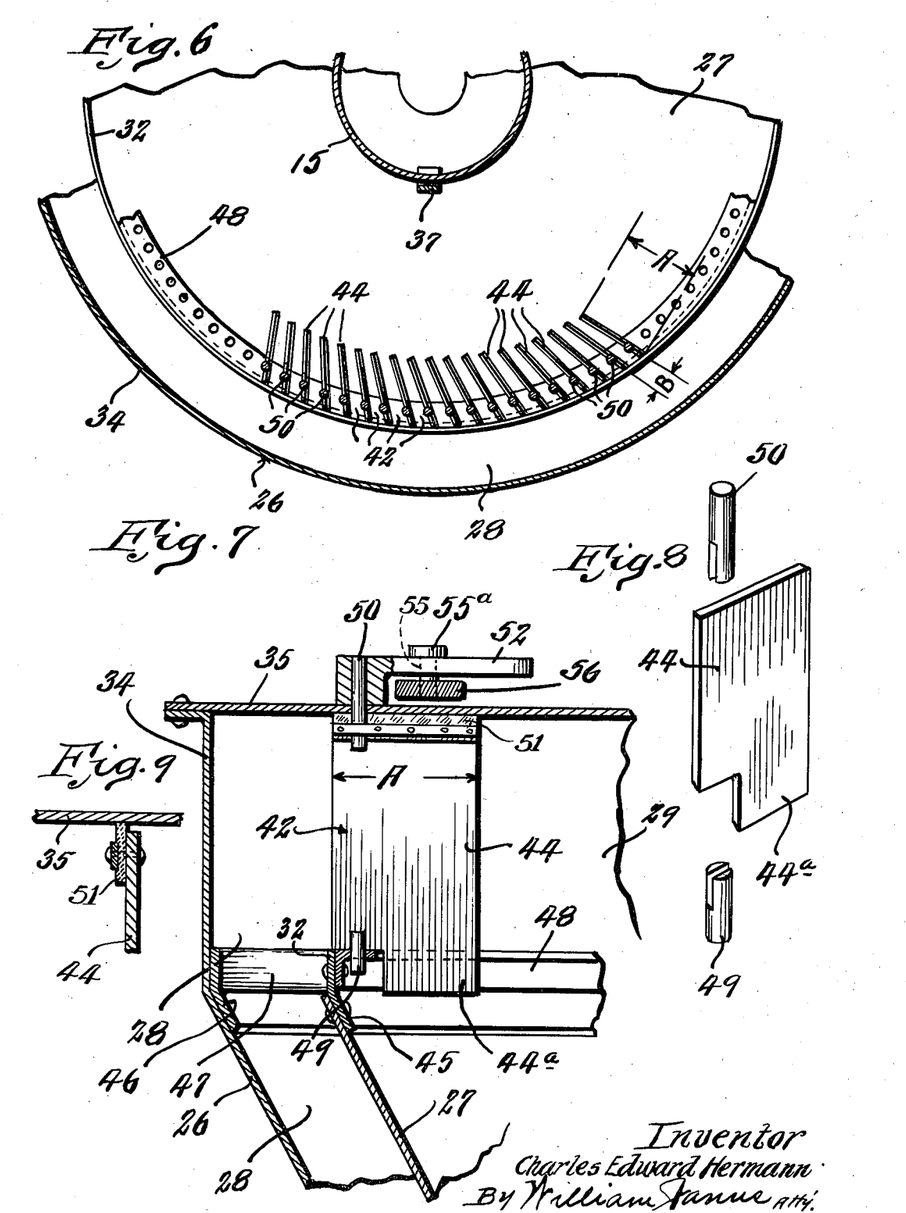
Figure 6 is an enlarged fragmental cross section taken horizontally through the separator and the vanes with some of the latter removed.
Figure 7 is an enlarged fragmental cross section showing details of the vane mounting.
Figure 8 is a perspective detail view of one of the vanes and the pivots therefor.
Figure 9 is a detail cross section of one of the vanes and the top wall.

These inlet openings 42 are formed by a plurality of spaced vanes or louvres 44 which are arranged concentrically of the vertical axis of the separator and extend upwardly from the upper edge of the inner cone member or shell 27 to the top plate 35 of the outer cone member or shell 26. Each vane is set at an angle to the radius of the separator whereby the air and pulverized material entering said inner cone or separating chamber receive whirling motion which due to the centrifugal force causes the coarse material to be separated from the air and fine material and collected in the separating chamber 29 of inner cone 27.

The vanes are comparatively close together and they are comparatively deep or of substantial widths so that each opening thus formed is comparatively narrow and deep. The purpose of this arrangement is to direct the currents of air in the proper direction and prevent the formation of stray currents which would impair the efficiency of the machine. The inlet openings being comparatively narrow, only the desired amount of air and pulverized material is admitted into the separating chamber 29 and the air is guided in the proper direction by the comparatively wide vanes which extend inwardly a substantial distance and serve to impart to the air currents the desired whirling motion.

Where the inlet openings are comparatively wide with respect to the depth of the vanes, as is the present practice, the air instead of being introduced into the separating chamber in a plurality of air currents of uniform direction is allowed to be diverted by stray currents which retard the formation of whirling motion and thereby greatly impair the efficiency of the machine. In my machine the inlet openings or passages being comparatively deep and narrow, the formation of stray currents is eliminated and the air and pulverized material introduced into the separating chamber is properly guided to induce whirling motion in an efficient manner and produce the desired classification or separation of material carried by the air. The inlet openings are of greater heights than those heretofore used, the purpose being to reduce the air resistance through said inlets so that the air and pulverized material can travel at reduced velocity without impairing the efficiency of the machine. The centrifugal force is the main factor in the classification of pulverized material and the high velocity produced by restricted openings as used in other separators and formerly thought necessary for fine operations, is not necessary in my separator as the larger inlet openings to the inner cone reduce the air resistance very greatly and my improved arrangement of vanes controls the air so that a more efficient whirling motion and the resultant centrifugal action is obtained than formerly. This not only provides for superior separation of material but also results in a larger output of the separator while operating on finer grades of material.

The cylindrical portion 32 of the inner cone member 27 is preferably formed by an annular ring 45 which forms reinforcement for the upper end of said cone member and supports the latter in spaced relation with the outer cone member 26. The latter is provided with a similar ring 46 and the two rings are connected together at a number of spaced apart points by spacers or arms 47, preferably formed integral with said rings.

A ring 48, right-angled in cross section, is secured to ring 45 with its horizontal flange extending inwardly. This flange is provided with a plurality of spaced apertures in which are received downwardly presented trunnions or pivots 49 of vanes or louvre plates 44. The upwardly presented pivots 50 are pivotally mounted in top plate 35 and project a suitable distance thereabove. Pivots 49 and 50 are formed of short sections of rods, each of which is preferably bifurcated at one end to engage the corresponding edge of the vane, as shown in Figure 8. These rods are secured to the vanes in any suitable manner, such as welding.

The inlets 42 are formed by said vanes 44 and the arrangement is such that very little resistance is offered by said vanes to the air entering the separating chamber. The upper edge of each vane has secured thereto a strip 51 of rubber or other material suitable to form a seal between said vane and the top wall 35. The lower end of each vane is provided with an extension 44a which extends below ring 46.

Figure 2:
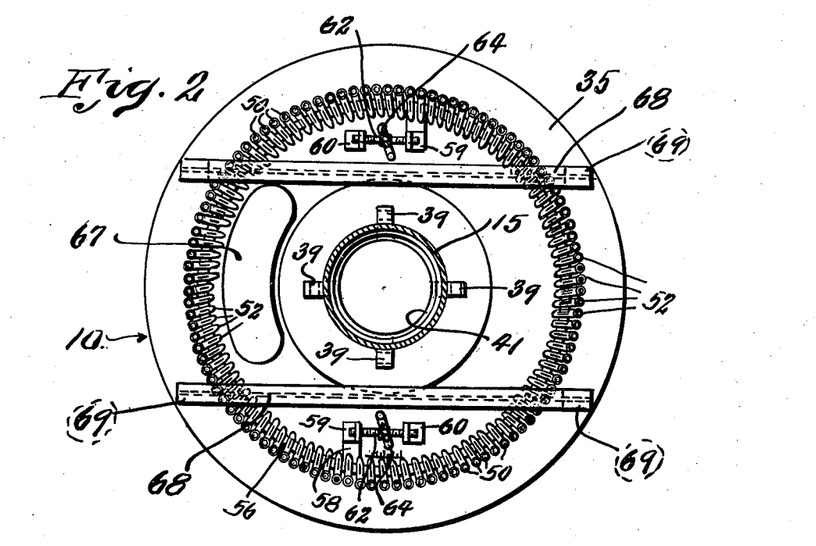
Figure 2 is an enlarged top plan view of the separator.
Figure 3:
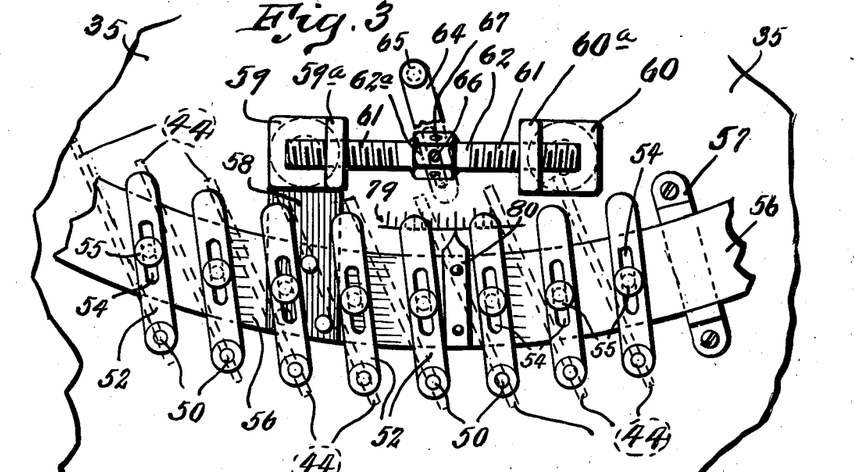
Figure 3 is an enlarged fragmental top plan view.

The vanes 44 are movably mounted and can be adjusted so as to regulate or direct the flow of air into the separating chamber tangentially with respect to the axis thereof. The upper pivots 50 which project above the top plate 35 have each fixed thereto an arm 52. This arm projects inwardly and is provided with a longitudinal slot 54 through which extends a pin 55. Pins 55 extend downwardly and have their lower end seated in a ring 56 which is disposed concentrically with the axis of the separator and is preferably mounted on bearings 57 so as to space said ring from top plate 35 to reduce friction and permit ease of operation of said ring. The upper ends of said pins terminate in heads 55a which rest against the upper faces of the respective arms and maintain the latter in proper operative engagement with ring 56.

Thus by moving the ring in proper direction around the axis of the separator, the arms 52 are simultaneously actuated, thereby positioning vanes 44 tangentially to said axis.

Any suitable means can be used to adjust the ring. As shown in the drawings, said ring has fixed thereto a pair of inwardly projecting arms 58, preferably diametrically opposed. To the inner end of each arm is pivotally fixed a bracket 59 having an upwardly extending portion 59a. A similar bracket 60 is pivotally mounted on plate 35 in spaced relation with bracket 59 and has an upstanding portion 60a arranged in opposed relation to portion 59a. Both of these portions are provided with threaded apertures for engagement with oppositely disposed screw-threaded ends 61 of a screw 62. The medial portion of this screw is enlarged and preferably formed hexagonal, as indicated at 62a, so as to permit a suitable tool to engage said screw and operate it to bring portions 59a and 60a toward each other, or away from each other, as the case may be. The screw is locked against accidental movement by a latch 64 which is movably mounted at one end on the top plate 35, as indicated at 65, and has its other end provided with a longitudinal slot and a pin 66, which latter is adapted to engage one of the apertures 67 formed in the faces of the hexagonal portion 62a. Thus when said pin occupies one of said apertures the screw is held against rotative movement, and to operate said screw it is necessary to remove said pin and remove the latch away from said hexagonal portion.

As the bracket 60 is stationarily mounted on plate 35, it will be obvious that the operation of the screw will cause movement of bracket 59 relatively to the first bracket. As this bracket 59 is in fixed relation with ring 56, the movement of bracket 59 to and from bracket 60 will result in corresponding rotary movement of ring 56. Both brackets 59 and 60 are pivotally mounted so as to permit the maintenance of portions 59a and 60a in parallelism with each other at all times.

Plate 35 is preferably provided with a suitable opening which is closed by a closure plate 67. Thus by detaching said closure plate, access can be had to the separating chamber. Top plate 35 is reinforced by a pair of I-beams 68. These I-beams are spaced from said plate, as indicated at 69, in order to clear ring 56 and arms 52.

As stated before, in my improved separator the vanes 44 are comparatively deep, as indicated at A, and the inlets 42 are comparatively narrow, as indicated at B. The purpose of this arrangement is to control the air currents to prevent deviation thereof in undesirable directions.

Figure 10:
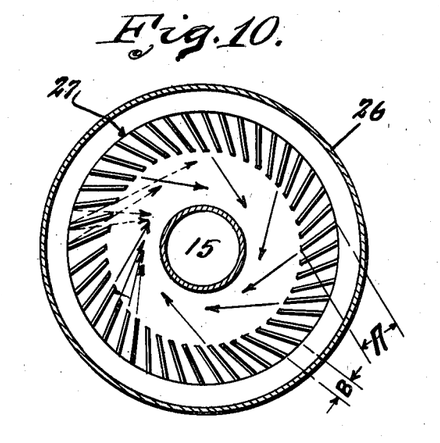
Figure 10 is a horizontal cross section of my improved separator showing diagrammatically the uniform flow of air thereinto.

In Figure 10 is shown diagrammatically the action of the air currents in my improved separator and it will be noted that all the air currents are directed to one side of the axis of the separator and not to the opposite sides.

Figure 11:
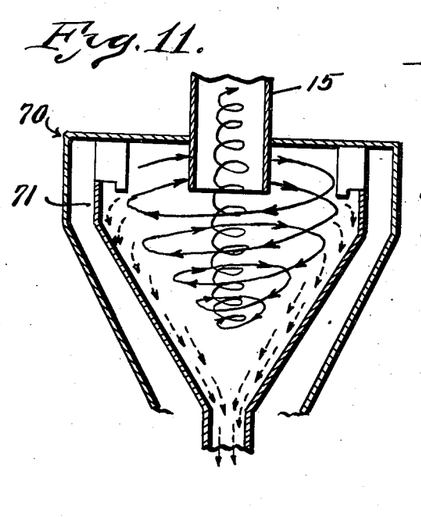
Figures 11 and 12 show modified forms of my improved separator.
Figure 12:
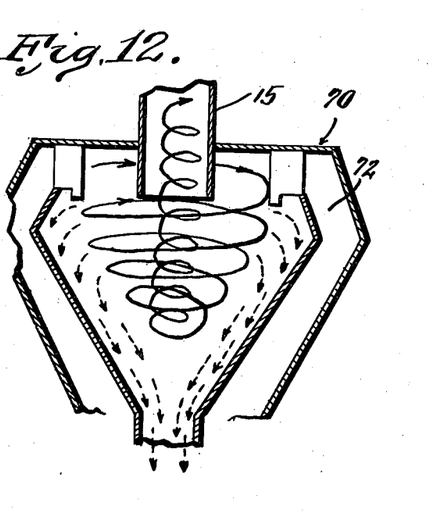

In the modified form shown in Figures 11 and 12 the separator 70 is formed with an extension below the vanes, this extension being cylindrical, as indicated in Figure 11 at 71, and being bulged outwardly as indicated at 72 in Figure 12. The purpose of this arrangement is to provide dead air space which is out of the zone of the whirling motion and consequently the coarse material thrown thereinto by centrifugal action is not affected by this whirling motion and can be readily precipitated, as indicated by dotted arrows in said figures. Thus a more efficient separation of material is obtained by this construction.

Figure 13:
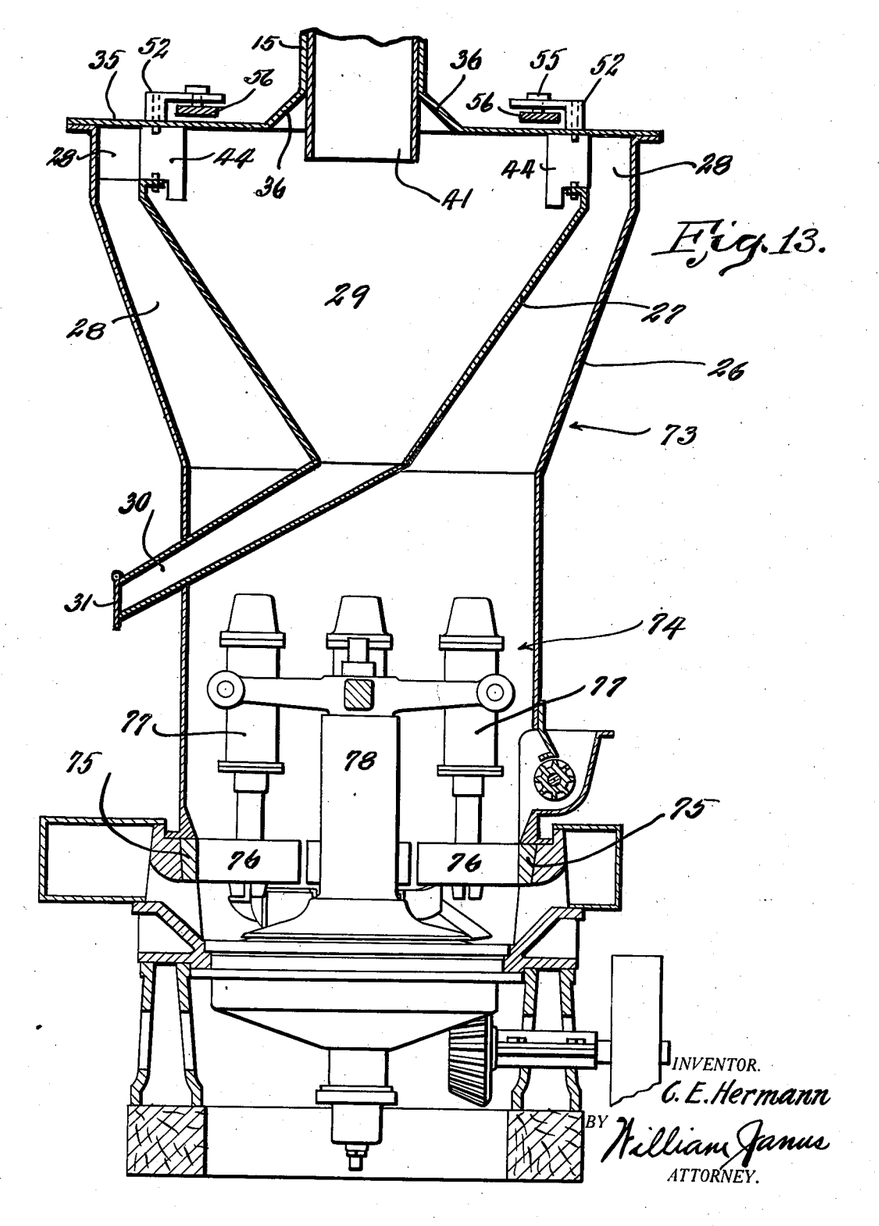
Figure 13 shows my improved separator applied to a mill.

In the modified form shown in Figure 13, a separator 73 of my improved construction is shown applied to a mill 74 which may be of any approved type. This type of mill includes a stationary ring 75 located in the pulverizing chamber and against which operate rollers 76 which are carried by journals 77. The latter are pivotally mounted upon a revoluble standard 78 and are operated by centrifugal action to force the rollers against the ring and pulverize the material. The pulverized material is then conveyed upwardly into the separator.

It will be noted that in my improved separator, the inlets 42 are formed by terminating the upper edge of the inner cone member 27 short of the top wall 35 of the separator. The vanes 44 extend between said top wall and the top edge of member 27 and separate said space into a plurality of inlets. The vanes are mounted by pivots extending upwardly and downwardly from the top and bottom edges of said vanes so that the mounting of the vanes does not impede the travel of air through said inlets. Thus only the edges of the vanes are presented in the path of the air and the air resistance is reduced to minimum and at the same time a comparatively large inlet area is provided. In the present case this inlet area is more than twice the cross sectional area of the discharge pipe. This insures more efficient operation of the machine.

I claim:

1. In a separator having a separating chamber provided with peripherally disposed inlet vanes and a ring movably disposed on top of said separator and connected to and operable for adjusting said vanes; the combination of a radial extension on said ring, a bearing member carried thereby, another bearing member mounted on said top in spaced relation with said first member, a screw mounted in said bearing members and operable to actuate said bearing member of said radial arm relatively to the other bearing member, thereby operating said ring and adjusting said vanes, and means for locking said screw in position.

2. In a separator having a separating chamber provided with peripherally disposed inlets and adjustable vanes arranged within said separating chamber in correlation with said inlets, of a ring movably mounted exteriorly of and on top of said separator, means for operatively connecting said rings with said vanes, a radial arm on said ring, a bearing member pivotally mounted on said arm, a bearing member pivotally mounted on said top in spaced relation with said first bearing member, a screw engaging said bearing members and operable to move the bearing member carried by said arm relatively to the other bearing member, thereby actuating said ring and adjusting said vanes, and means mounted on said top and engaging said screw for locking the latter against movement, said means being displaceable relatively to said screw and permit operation of the latter.

3. In a separator, the combination of an outer shell member having a flat top wall, an inner shell member arranged within and in spaced relation with the first member and having its upper edge terminating short of said top wall, thereby forming an annular inlet space therebetween, a ring fixed within said inner cone member below said inlet space, a plurality of vanes arranged in said inlet space in spaced relation with each other and forming a plurality of inlets, means for supporting said inner shell member within said outer member below the bottoms of said vanes, pivots secured to the top and bottom edge of each vane and pivotally mounted in said top wall and said ring whereby said inlets are formed with minimum air resistance, the upper pivots of said vanes extending outwardly from said top wall, and means operatively associated with said projecting portions of said pivots for adjusting simultaneously all of said vanes.

4. In a separator, the combination of an outer inverted cone member having its lower end forming an inlet and having its upper end provided with a flat top wall, an inner inverted cone member supported within said outer member in spaced relationship therewith, the upper end of said inner cone member terminating short of said flat wall to form an inlet opening therebetween, a plurality of vanes vertically disposed within said inlet opening, the upper ends of said vanes being pivotally mounted in said flat top wall and the lower ends being pivotally supported by said inner cone member, said vanes being arranged close together and being comparatively wide to provide inlets which are comparatively narrow and extend inwardly and tangentially into said inner cone member for a suitable distance, the upper pivots of said vanes extending outwardly through said top wall, means for engaging said projecting pivots and simultaneously adjusting all of said vanes, and a pipe extending through said top wall into said inner cone member and forming an outlet for fine material, the lower end of said inner cone member extending outwardly through said outer cone member and forming an outlet for coarser material.

5. In a separator, the combination of an outer inverted cone member having its lower end forming an inlet and having its upper end closed by a flat top wall, an inner inverted cone member supported within said outer member in spaced relationship therewith and having its upper end terminating short of said top wall to form an inlet opening therebetween, a ring fixed to said inner cone member, a plurality of vanes vertically disposed within said inlet opening and having their lower ends pivotally mounted in said ring and their upper ends in said top wall, said vanes being arranged in close relationship and being comparatively wide to provide inlets which are comparatively narrow and extend inwardly a suitable distance, the upper pivots of said vanes extending outwardly through said top wall, means for engaging said pivots and simultaneously adjusting all of said vanes, and a pipe extending axially through said top wall into said inner cone member to provide an outlet for fine material, the coarser material being collected in the lower end of said inner cone member which extends outwardly through said outer cone member.

6. In a separator, the combination of an outer inverted cone member having its lower end forming an inlet and having its upper end closed by a flat top wall, an inner inverted cone member supported within said outer member in spaced relationship therewith and having its upper end terminating short of said top wall to form an inlet opening therebetween, a ring fixed to said inner cone member, a plurality of vanes vertically disposed within said inlet opening and having their lower ends pivotally mounted in said ring and their upper ends in said top wall, said vanes being arranged in close relationship and being comparatively wide to provide inlets which are comparatively narrow and extend inwardly a suitable distance, the upper pivots of said vanes extending outwardly through said top wall, means for engaging said pivots and simultaneously adjusting all of said vanes, a pipe extending axially through said top wall into said inner cone member to provide an outlet for fine material, the coarser material being collected in the lower end of said inner cone member which extends outwardly through said outer cone member, and a strip of packing material secured to the upper edge of each vane to form a sealed joint between said edge and the underside of said flat wall.

7. In a separator for pulverized material, the combination of an outer inverted cone member provided with an intake, an inner inverted cone member arranged within and spaced from said outer member, a flat top wall common to both of said cone members, a discharge pipe axially opening into said inner cone member and extending outwardly through said top wall, said inner cone member being provided with a plurality of peripherally spaced inlets, a ring fixed to said inner cone member below said inlets, a plurality of vertically disposed vanes pivotally mounted in said ring and said top wall, said vanes being peripherally arranged to form said inlets, said vanes being disposed wholly within the vertical plane of said inner cone member and extending inwardly thereinto for directing the flow of air and pulverized material tangentially therein, the width of each inlet being substantially less than the depth of the corresponding vane to prevent formation of cross currents of air, and means located exteriorly on said top wall and operatively connected with all of said vanes for simultaneously adjusting the latter relatively to the axis of said inner cone, thereby controlling the radius of the whirling motion produced within said inner cone and thus regulating the degree of fineness of material discharged therefrom.

8. In a separator for pulverized material, the combination of an outer inverted cone having an intake in its lower end, an inner inverted cone arranged within and spaced from said outer cone, a flat top wall for closing the upper end of said inner cone member, a discharge pipe arranged coaxially within said inner cone member and extending outwardly through said top wall, said inner cone member being provided adjacent to said top wall with a plurality of peripherally spaced inlets, a ring fixed to said inner cone member below said inlets, a plurality of vanes pivotally mounted at their upper and lower ends to said flat top wall and said ring, respectively, said vanes being peripherally arranged within said inner cone member to form said inlets and wholly arranged within the vertical plane of said inner cone member, said vanes being angularly disposed for directing the flow of air and pulverized material tangentially from said outer cone member into said inner cone member, a ring movably mounted on said top wall and operatively associated with said vanes for simultaneously adjusting the angle of inclination of all of said vanes relatively to the axis of said inner cone member, and means disposed on said top wall for actuating said ring.

9. In a separator of the class described, the combination of an outer inverted cone member having its lower end forming an inlet, a top wall for closing the upper end of said outer member, an inner inverted cone member supported within said outer member, the upper end of said inner member terminating short of said top wall to form an inlet opening between said members, the lower end of said inner member forming an outlet for coarse material, a plurality of vertically disposed vanes arranged peripherally between the upper end of said inner member and said top wall, each vane being of substantially greater width than the distance between two adjacent vanes whereby the inlet passages formed by said vanes are formed comparatively narrow and deep to insure the discharge of air and material into said inner member in the desired direction and eliminate formation of cross currents, and a pipe extending downwardly through said top wall axially into said inner member and forming an outlet therefrom for air and fine material.

10. In a separator of the class described, the combination of an outer inverted cone member having its lower end forming an inlet, a top wall for closing the upper end of said outer member, an inner inverted cone member supported within said outer member, the lower end of said inner member forming an outlet for coarse material, the upper end of said inner member terminating short of said top wall to form an inlet opening between said members, a plurality of vertically disposed vanes pivotally and peripherally arranged between the upper end of said inner member and said top wall, each vane being of substantially greater width than the distance between two adjacent vanes whereby the inlet passages formed by said vanes are comparatively narrow and deep to insure the discharge of air and material into said inner member in the desired direction and prevent formation of cross currents, a pipe extending downwardly through said top wall axially into said inner member and forming an outlet for air and fine material, and means for simultaneously adjusting all of said vanes relatively to the center of said inner member and regulate the degree of separation of fine material from coarse material.

11. In a separator for pulverized material, the combination of an outer inverted cone member, an inner inverted cone member arranged within and spaced from said outer cone member, a top wall common to both of said cone members, a ring fixed to said inner cone member, a plurality of vertically disposed vanes peripherally arranged between the upper end of said inner cone member and said top wall and pivotally mounted in said ring and said top wall, said vanes extending inwardly into said inner cone member to form a plurality of inlets for directing the flow of air and pulverized material thereinto, means arranged exteriorly on said top wall for adjusting simultaneously all of said vanes relatively to the axis of said inner cone member to regulate the angle of flow and control the degree of fineness of material discharged therefrom, and a discharge duct opening axially into said inner cone member and extending outwardly from said top wall for conveying away the fine material.

12. In a separator for pulverized material, the combination of an outer inverted cone member having an intake in its lower end, an inverted cone member arranged within and spaced from said outer cone member, a top wall common to both of said cone members, a discharge pipe arranged coaxially with said inner cone member and extending outwardly through said top wall, a ring fixed to said inner cone member, a plurality of vertically disposed vanes peripherally arranged between said top wall the upper end of said inner cone member and pivotally mounted in said ring and said top wall, said vanes being wholly arranged within the area of said inner cone member to form a plurality of tangentially disposed inlets therefor, the width of each inlet being less than the depth of the vane to prevent formation of cross currents, each vane being provided at its upper end with a trunnion extending upwardly through said top wall, an arm fixed to each projecting trunnion, and a horizontally disposed ring movably mounted on said top wall and operatively connected to all of said arms for simultaneously adjusting all of said vanes.

CHARLES EDWARD HERMANN.